July 25, 1939.  R. E. HENDRICKSON  2,167,072
WELL SURVEYING DEVICE
Filed Sept. 27, 1937
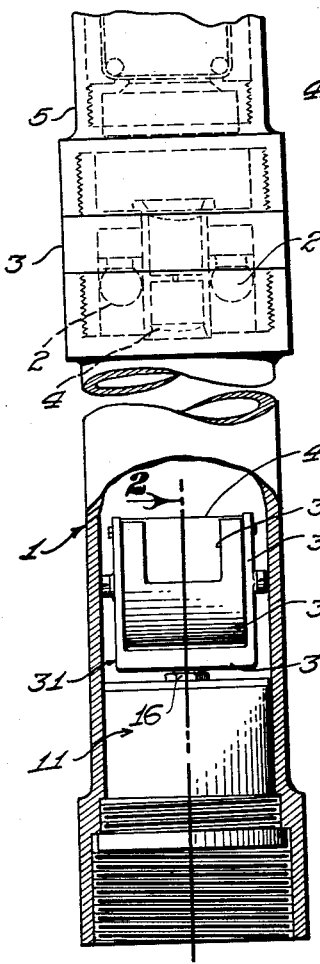
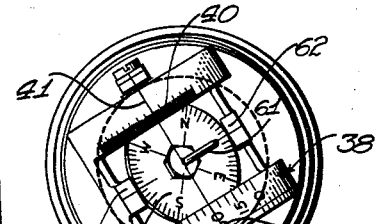
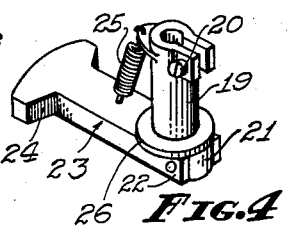
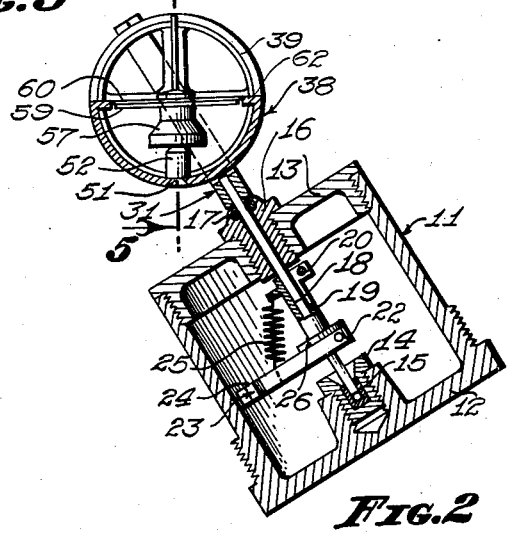
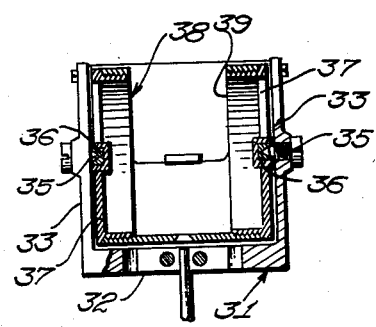
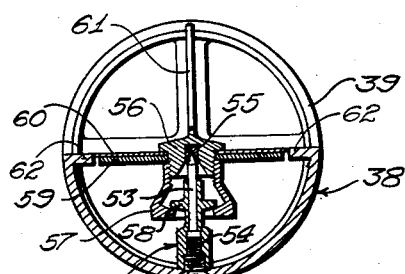
Inventor
RALPH E. HENDRICKSON
By Lloyd Spencer
Attorney Patented July 25, 1939

2,167,072

UNITED STATES PATENT OFFICE 2,167,072

WELL SURVEYING DEVICE

Ralph E. Hendrickson, Fullerton, Calif., assignor to Lane-Wells Company, Los Angeles, Calif., a corporation of Delaware Application September 27, 1937, Serial No. 165,917

5 Claims. (Cl. 33—205.5)

My invention relates to well surveying devices, and among the objects of my invention are:

First, to provide a device of this class which is particularly designed for well bores deviating materially from the vertical;

Second, to provide a device of this class which indicates the degrees of inclination and azimuth directly, thereby minimizing computation;

Third, to provide a device of this class wherein a compass is incorporated in and suspended with the inclinometer element in such a manner that the necessary scale indicia of each element may be readily photographed without interference with the other;

Fourth, to provide an inclination and azimuth indicating device which is particularly compact, without sacrificing legibility of the inclinometer and compass elements;

Fifth, to provide a device of this class which, although sensitive to changes in inclination and direction, is sturdy and rugged of construction so as to withstand rough handling; and Sixth, to provide a device of this class having an off-center mass rotatable about a vertical axis, and tending to rotate into the plane of maximum inclination, wherein said mass is yieldably mounted to cushion the effect of its inertia upon said shaft and minimize damage to the shaft bearing.

With the above and other objects in view, as may hereinafter apear, reference is made to the accompanying drawing, in which:

Figure 1 is a partial elevational, partial sectional and fragmentary view of a surveying instrument incorporating my device, but with the outer case omitted;

Figure 2 is a longitudinal sectional view through my device, removed from its shell and with the parts thereof shown in the positions assumed when the device is inclined;

Figure 3 is a plan view of my device as it appears when inclined, the view being taken at right angles to the longitudinal axis of the device and bearing a dotted ring to indicate the field covered by the recording or photographic mechanism;

Figure 4 is a perspective view of the counterbalance element;

Figure 5 is a longitudinal sectional view through 6—6 of Figure 2, with the compass unit removed; and Figure 6 is an enlarged, transverse sectional view through the compass unit.

My device is adapted to be enclosed in a shell 1, at the upper end of which are arranged illuminating bulbs 2, these being secured in a coupling 3. The coupling 3 also supports a lens system 4. Above the coupling 3 there may be provided a case 5 which carries a suitable photographic recording mechanism, either of the single shot or multiple shot type. These parts are also enclosed in an outer, protective case—not shown.

The shell 1 is internally threaded at its lower end to receive a cylindrical housing 11, closed at its lower end by a base 12 and at its upper end by a removable screw-threaded cover 13. The base 12 supports a bearing mounting 14 in which is set a jewel thrust bearing 15. The cover 13 is likewise provided with a bearing mounting 16 which carries a jewel ring bearing 17.

The bearings 15 and 17 support a shaft 18. Between the bearings the shaft 18 is provided with a sleeve 19 which is split at its upper portion and receives a locking screw 20 so that the sleeve 19 may be secured to the shaft 18. The lower end of the sleeve 19 is provided with a lug 21, along the sides of which fit the bifurcated end 22 of a weight member 23. The weight member 23 extends radially from the sleeve 19 and is provided with an enlarged extremity 24. The upper end of the sleeve 19 is provided with a small bracket in which is anchored one end of a spring 25, the other end of which is secured in the weight member 23, whereby the spring tends to urge the weight member upwardly. The weight member is restrained against movement above a right angle position, with respect to the shaft 18, by reason of a flange 26 on the sleeve 19. Thus, any sudden jar of the shaft 18 downwardly against the thrust bearing 15 is minimized for the reason that the weight member can yield downwardly.

The upper end of the shaft 18 protrudes from the housing 11 and receives a yoke 31. The yoke 31 comprises a cross member 32 and right-angularly disposed upstanding arm members 33. The cross member is split longitudinally at its intermediate portion and receives two clamp screws 34 for securing the yoke to the shaft 18.

The arms 33 carry a pair of axially alined journal pins 35. Each journal pin 35 supports, by means of a bushing 36, a wheel 37. Each wheel is provided with a threaded periphery to receive an end of a drum-shaped inclinometer unit 38. The inclinometer unit is in the form of a thin shell having a central semi-cylindrical slot 39 therein. By reason of the slot, the inclinometer drum 38 has its center of gravity offset downwardly from the axis of the journal pins 35. Similarly, the wheels 37 are arranged with relatively larger masses opposite the unslotted portion of the inclinometer drum 38 so that a predetermined line on the periphery of the inclinometer drum tends to remain vertically over the axis of the pins 35. The arcuate portions of the inclinometer drum 38, bordering the axial extremities of the slot 39, are provided with inclinometer scales 40. These scales may differ in their markings to facilitate reading, as shown best in Figure 3.

The arms 33 of the yoke extend above the pins 35 and are connected by a fine hair-line wire 41. The hair-line wire 41 crosses the scales 40 and crosses the axis of the shaft 18. The scales are read in reference to the hair-line wire.

The bottom of the drum 38 is apertured to receive a screw 51 which secures an upright stem 52. The stem 52 carries an axially slidable pin 53 and a spring 54, so arranged as to urge the pin 53 upwardly. A jewel thrust bearing 55 rests on the pin 53 and is fitted in a bushing 56. The bushing 56 is recessed conically at its lower end and is externally threaded to receive a retaining ring 57. The stem 52 is provided with an enlarged head 58, extending within the retaining ring 57 and of greater diameter than the aperture in the retaining ring 57, so that the jewel bearing 55 cannot be lifted upwardly far enough to be unseated from the pin 54.

A compass needle 59 and compass card 60 are clamped between the bushing 56 and retaining ring 57. The compass card is marked to indicate the cardinal points of the compass and intermediate directions. The bushing 56 is provided with an upstanding shaft 61 of small diameter, the extremity of which serves as a plumb bob to indicate inclination and as a check on the inclinometer unit.

At points exactly at right angles to the hair-line wire 41, and in a plane intersecting the axis of the shaft 18, the inclinometer drum 38 is provided with inturned lugs 62 having center lines marked thereon.

Operation of my well surveying device is as follows: When the axis of the shaft 18 is inclined, said shaft is rotated by the eccentric weight of the weight member 23 until this member is in its lowest position. The yoke 31 is at right angles thereto; that is, the plane of the yoke 31 coincides with the plane of maximum inclination when the weight member 23 reaches equilibrium. In addition, the lower and heavier sides of the inclinometer drum 38 and wheels 37 cause these members to rotate, or more correctly, maintain their position as the axis of the shaft 18 is tilted, whereby the stem 52 remains vertical. Consequently, the compass and the compass card 59 and 60 tend to maintain a horizontal position. The compass is free to rotate and indicate the magnetic "North". The amount of inclination is determined by reading the scales 40 with reference to the hair-line wire 41. Direction is determined by reading the compass card with respect to the center lines appearing on the lugs 62. Should, for any reason, the shaft 18 fail to assume proper position, the extremity of the plumb bob 61 will not aline with the center lines on lugs 62 and thus serve as a check. This is due to the fact that there is considerably less friction involved in the mounting for the plumb bob 61 in the inclinometer unit.

It is, of course, intended that the compass and inclinometer be photographed. The field of the photographic record is delineated by the dotted line in Figure 3. The difference in height of the compass and the inclinometer scale, with respect to the photographic film and lens system, is such that both are substantially in focus. However, the inclinometer scale may be brought exactly in focus and the compass scale may be slightly out of focus, without harmful results, inasmuch as the compass scale need not be read with the accuracy desired in the inclinometer scale.

Though I have shown and described a particular embodiment of my invention, I do not wish to be limited thereto, but desire to include in the scope of my invention the constructions, combinations and arrangements substantially as set forth in the appended claims.

I claim:

1. A well surveying device comprising: a cylindrical inclination element having an eccentric mass; means for journaling said element about its longitudinal axis; other means journaling said element about a second axis at right angles thereto; inclination scale extending circumferentially on said element; reference means journaled with said element by said other journal means for cooperation with said inclination scale; a pivot carried by said inclination element tending to maintain a vertical position; an upstanding plumb bob mounted on said pivot; and indicia on said inclination element coacting with said plumb bob for checking the accuracy of said inclination element.

2. A well surveying device comprising: a cylindrical inclination element having an eccentric mass; means for journaling said element about its longitudinal axis; other means journaling said element about a second axis at right angles thereto; inclination scale extending circumferentially on said element; reference means journaled with said element by said other journal means for cooperation with said inclination scale; a compass mounted within said inclination element, there being an aperture in the inclination element to expose the compass; a plumb bob carried by said compass; and indicia on said inclination element coacting with said plumb bob for checking the accuracy of said inclination element.

3. A well surveying device comprising: a cylindrical inclination element having an eccentric mass; means for journaling said element about its longitudinal axis; other means journaling said element about a second axis at right angles thereto; inclination scale extending circumferentially on said element; reference means journaled with said element by said other journal means for cooperation with said inclination scale; a compass mounted within said inclination element, there being an aperture in the inclination element to expose the compass; a plumb bob carried by said compass; indicia on said inclination element coacting with said plumb bob for checking the accuracy of said inclination element; and means for photographing a composite image of said inclination scale and compass, plumb bob and indicia.

4. A well surveying device comprising: a cylindrical housing; a shaft journaled longitudinally therein; a cylindrical inclination element journaled across said shaft; an eccentric mass associated with said shaft and positioned to urge the axis of said inclination element into the plane of maximum inclination; circumferentially disposed inclination scale on said inclination element; a compass support extending upwardly from the normally bottom side of said inclination element; a compass pivotally supported thereon within said inclination element and tending to maintain itself in a horizontal plane; a device for indicating whether or not said compass occupies a horizontal plane, thereby to check the accuracy of said inclination element; and means for photographing a composite image of said inclination scale, compass and said device, there being a window in said inclination element exposing the compass.

5. A well surveying device comprising: a housing; a shaft mounted longitudinally therein; an inclinometer support carried by said shaft; an inclinometer element journaled by said support about an axis traversing said shaft and having its greater mass below its axis; an inclination scale associated with said inclination element; an eccentric weight carried by said shaft and so positioned, with respect to said support, as to urge the axis of said inclinometer unit into the plane of maximum inclination, upon inclination of said shaft; and yieldable means supporting said weight to cushion shocks transmitted to said shaft by said weight.

RALPH E. HENDRICKSON.